(12) United States Patent
Nakajima (10) Patent No.: US 8,021,261 B2
(45) Date of Patent: Sep. 20, 2011

(54) DIFFERENTIAL LIMITING APPARATUS

(75) Inventor: Shinichiro Nakajima, Niiza (JP)

(73) Assignee: JTEKT Corporation, Osaka-shi (JP)

( * ) Notice: Subject to any disclaimer, the term of this patent is extended or adjusted under 35 U.S.C. 154(b) by 420 days.

(21) Appl. No.: 12/238,604

(22) Filed: Sep. 26, 2008

(65) Prior Publication Data

US 2009/0088288 A1   Apr. 2, 2009

(30) Foreign Application Priority Data

Sep. 28, 2007  (JP) .................................. 2007-254286

(51) Int. Cl.
F16H 48/20 (2006.01)
(52) U.S. Cl. ........................................ 475/249; 475/252
(58) Field of Classification Search .................. 475/230, 475/231, 248, 249, 252
See application file for complete search history.

(56) References Cited

U.S. PATENT DOCUMENTS

| | | | |
|---|---|---|---|
| 3,869,940 A | 3/1975 | Webb et al. | |
| 4,781,078 A * | 11/1988 | Blessing et al. | 475/150 |
| 5,269,730 A * | 12/1993 | Hirota | 475/150 |
| 5,326,333 A * | 7/1994 | Niizawa et al. | 475/249 |
| 5,464,084 A * | 11/1995 | Aoki et al. | 192/35 |
| 5,527,229 A * | 6/1996 | Ishihara et al. | 475/249 |
| 6,371,880 B1 * | 4/2002 | Kam | 475/249 |
| 7,008,345 B2 * | 3/2006 | Phelan et al. | 475/231 |
| 7,144,347 B2 * | 12/2006 | Kushino | 475/249 |
| 7,276,010 B2 * | 10/2007 | Kushino | 475/249 |
| 7,553,252 B2 * | 6/2009 | Murakami et al. | 475/249 |
| 7,717,818 B2 * | 5/2010 | Suzuki et al. | 475/150 |
| 2006/0014602 A1 * | 1/2006 | Sayama | 475/231 |
| 2006/0046890 A1 * | 3/2006 | Aikawa | 475/231 |
| 2007/0111842 A1 | 5/2007 | Suzuki et al. | |

FOREIGN PATENT DOCUMENTS

EP    1 602 859    12/2005

OTHER PUBLICATIONS

Extended European Search Report issued Jul. 4, 2011, in Patent Application No. 08165189.5.

* cited by examiner

Primary Examiner — David D Le
Assistant Examiner — Michael Gonzalez
(74) Attorney, Agent, or Firm — Oblon, Spivak, McClelland, Maier & Neustadt, L.L.P.

(57) ABSTRACT

A differential limiting apparatus includes a housing 2 rotated by driving force of a driving source, a differential mechanism 3 having a pair of output gears 3A, 3B to distribute the driving force to a pair of output shafts differentially, a clutch 4 disposed directly between the pair of output gears 3A, 3B and having the inner clutch plate 4A and an outer clutch plate 4B as an annular frictional plate to restrict a differential movement of the differential mechanism 3, and an output mechanism 5 driving the clutch 4. The output mechanism 5 includes a first cam 52C moved along an axial direction, and a pushing pin 35 as a transmitting member transmitting the axial movement of said first cam 52C to the clutch 4.

7 Claims, 5 Drawing Sheets

DIFFERENTIAL LIMITING APPARATUS

INCORPORATION BY REFERENCE

The present application claims priority under 35 U.S.C. §119 to Japanese Patent Application No. 2007-254286, filed on Sep. 28, 2007. The content of the application is incorporated herein by reference in their entirety.

BACKGROUND OF THE INVENTION

1. Field of the Invention

The present invention relates to a differential limiting apparatus, and more particularly relates to the differential limiting apparatus having a clutch restricting a differential movement of a differential mechanism.

2. Description of the Prior Art

It is well known for a prior differential limiting apparatus to restrict a differential movement of the differential apparatus by connecting between an input shaft and an output shaft of a pair of output shafts, as disclosed in published patent document Tokkai 2007-138983.

This conventional differential limiting apparatus includes a housing rotated with an input shaft, a differential mechanism distributing differentially a rotating force from the housing, a clutch restricting a differential movement of the differential mechanism and a driving mechanism driving the clutch.

The housing includes a front housing comprising a hollow cylindrical body having a bottom and opening to one direction, a rear housing comprising an annular cylindrical body provided on the opening of the front housing. The housing is connected to the input shaft and constructed to rotate by receiving a driving force from a driving source such as an engine of a vehicle.

The differential mechanism includes a ring gear as a pair of output gears respectively connected to the pair of output shafts, a sun gear, planetary gears engaged in mesh with the ring gear and the sun gear. The differential mechanism is accommodated in the housing and constructed to distribute a rotational force from the housing to a pair of the output shafts differentially.

The clutch includes a plurality of outer clutch plates and a plurality of inner clutch plates and the clutch is disposed between an inner surface of the housing and an outer surface of the ring gear. The clutch is constructed to connect the input shaft and one output shaft in order to restrict the differential movement of the differential mechanism when the plural outer clutch plates and the plural inner clutch plates are engaged by friction. The plural outer clutch plates are engaged by spline engagement with the inner surface of the front housing and the plural inner clutch plates are engaged by spline engagement with the outer surface of the ring gear. Each of the plural outer clutch plates and each of the plural inner clutch plates are disposed alternatively with each other.

The driving mechanism includes an electromagnetic clutch, a pilot clutch driven by receiving an electromagnetic force from the electromagnetic clutch, and a cam mechanism transforming a rotational force from the housing to a pushing force toward a main clutch by driving the pilot clutch. The driving mechanism is disposed around peripheries of a pair of output shafts inside the housing. The pushing force is transmitted via a cylindrical portion to a bottom portion of a cylindrical output transmitting member having the bottom portion and a cylindrical portion, and after that transmitted via the cylindrical portion of the output transmitting member to the main clutch in order to connect the outer clutch plates and the inner clutch plates by friction.

In the above-mentioned construction of the prior art, when the driving force from an engine is input into the housing through the input shaft, the housing is rotated around the rotational axis. Upon the rotation of the housing, the rotational force is transmitted to the planetary gear, and after that from the planetary gear to the ring gear and the sun gear. Since the ring gear and the sun gear are respectively connected to each of the output shafts, the driving force from the engine is distributed differentially according to a state of the driving of the vehicle and the differentially distributed torque is transmitted to the right and left output shaft.

In this stage, when the electromagnetic clutch is energized, the pilot clutch starts to be driven by the electromagnetic force of the electromagnetic clutch. At this time, the rotational force of the housing is transformed to a pushing force by the cam when the rotational force from the housing is received by the cam at the driving stage of the pilot clutch. The pushing force is exerted from the output member to the main clutch through the output transmitting member. Then the outer clutch plates and the inner clutch plates relatively approach one another to be contacted by friction, whereby the housing and the ring gear are connected, that is to say the input shaft and the output shaft corresponding to the ring gear are connected to be able to transmit the rotational force so that the differential movement is restricted.

However, in the differential limiting apparatus of the published patent document of Tokkai 2007-138983 as the prior art, it is necessary for the conventional differential limiting apparatus to increase a number of the clutch plates in order to obtain the larger differential limiting force, resulting in a bigger longitudinal size of the whole apparatus if a longitudinal length of the main clutch is longer than a longitudinal length of the planetary gear and a longitudinal length of the flange portion of the ring gear. As a result, a number of the outer clutch plates and the inner clutch plates are limited so that a capacity of the clutch is limited, whereby a sufficiently large differential limiting force cannot be obtained.

SUMMARY OF THE INVENTION

In view of the previously mentioned circumstances, it is an object of the present invention to provide a differential limiting apparatus increasing the capacity of the clutch to obtain a large enough differential limiting force. Particularly, the differential limiting apparatus has a clutch for restricting the differential movement and installed between a pair of output shafts to increase the capacity of the clutch to obtain the sufficiently large differential limiting force.

In order to achieve the above and other objects, differential according to one aspect of the present invention includes a housing rotatable by driving force of a driving source, a differential mechanism having one pair of output gears to distribute the driving force to one pair of output shafts differentially, a clutch disposed directly between the pair of output gears and having an annular frictional plate to restrict a differential movement of the differential mechanism, and an output mechanism for driving the clutch. Thereby, the clutch of the present invention is constructed to connect directly the pair of output gears to transmit the rotational force of the housing so that a differential restricting force of the differential mechanism created by the clutch is doubled, compared to the conventional differential limiting apparatus having the clutch installed between the input shaft and one of output gears. Namely, the differential rotation of the output gears is doubly restricted by two types of restriction based on two operations: torque of the other of output gears transmitted to the one of output gears through the clutch restricts a rotation of the one of output gears, and torque of the one of output gears transmitted to the other of output gears through the clutch restricts a rotation of the other of output gears because the clutch is installed directly between the pair of output gears.

A second aspect of the present invention according to the one aspect of the present invention provides a differential limiting apparatus mainly having the clutch installed directly and circumferentially on the pair of output gears. Thereby, the differential limiting apparatus can reduce a total longitudinal length of the apparatus because the clutch is installed in a radial direction of the pair of output gears.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

[Whole Construction of the Differential Device for the Vehicle]

Figure 1:
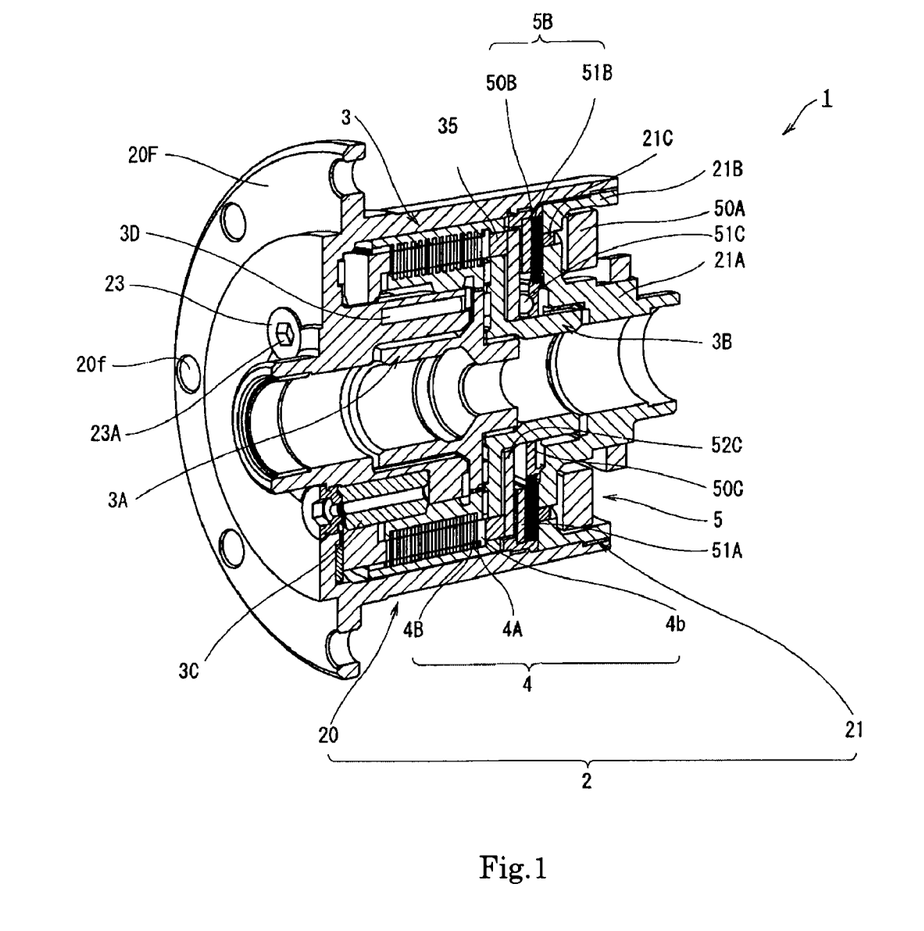
FIG. 1 is a partially cut oblique perspective diagram explaining a differential limiting apparatus according to one embodiment of the present invention.
Figure 2:
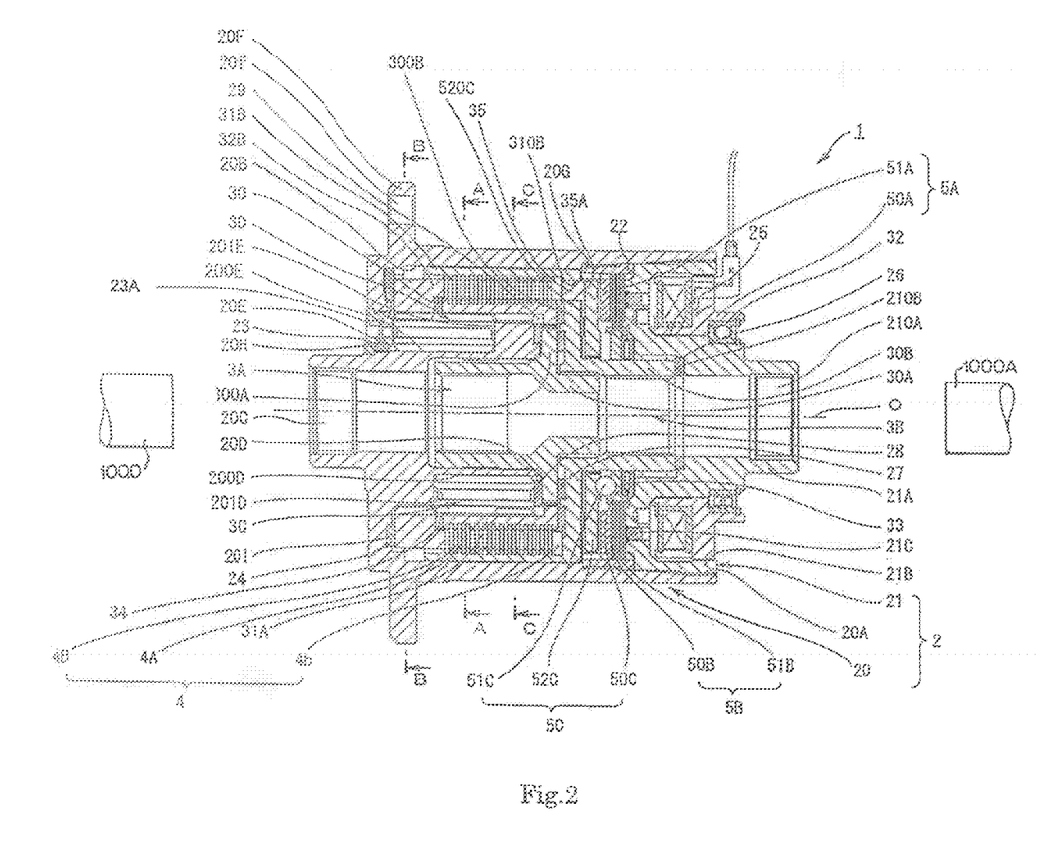
FIG. 2 is a cross sectional diagram explaining a differential limiting apparatus according to one embodiment of the present invention.

In FIG. 1 and FIG. 2, a numeral 1 shows the differential limiting apparatus according to one embodiment of the present invention. The differential limiting apparatus 1 mainly consists of a housing 2 rotated by receiving torque from an engine, a differential mechanism 3 distributing differentially rotational force from the housing 2 to a pair of tire shafts 1000 and 1000A, a clutch 4 limiting a differential operation of the differential mechanism 3, and an output mechanism 5 operating the clutch 4.

[Construction of the Housing 2]

The housing 2 is a hollow construction driven rotatably around a rotational axis O as a whole and consists of a hollow cylindrical front housing 20 having a bottom, and a rear housing 21 being almost circularly annular, as shown in FIGS. 1, 2. The front housing 20 includes a parts inserting inlet 20A opened to one direction along the rotational axis O to the tire shafts. The rear housing 21 covers the parts inserting inlet 20A of the front housing 20.

The front housing 20 has an accommodating space 20B, a tire shaft inserting hole 20C, first gear accommodating spaces 20D, and second gear accommodating spaces 20E, as shown in FIG. 2. The accommodating space 20B is communicated with the parts inserting inlet 20A in order to accommodate the differential mechanism 3, the clutch 4 and most of the output mechanism 5. The tire shaft inserting hole 20C is communicated with the accommodating space 20B. The number of the first gear accommodating spaces 20D and the second gear accommodating spaces 20E is respectively five in the one embodiment. In the front housing 20 are formed plural first torque transmitting faces 200D, plural first pinion gear supporting surfaces 201D, plural second torque transmitting faces 200E, and plural second pinion gear supporting surfaces 201E. Each of these first torque transmitting faces 200D and first pinion gear supporting surfaces 201D defines one of a plurality of the first gear accommodating spaces 20D, and each of these second torque transmitting faces 200E and second pinion gear supporting surfaces 201E defines one of the second gear accommodating spaces 20E.

Figure 3:
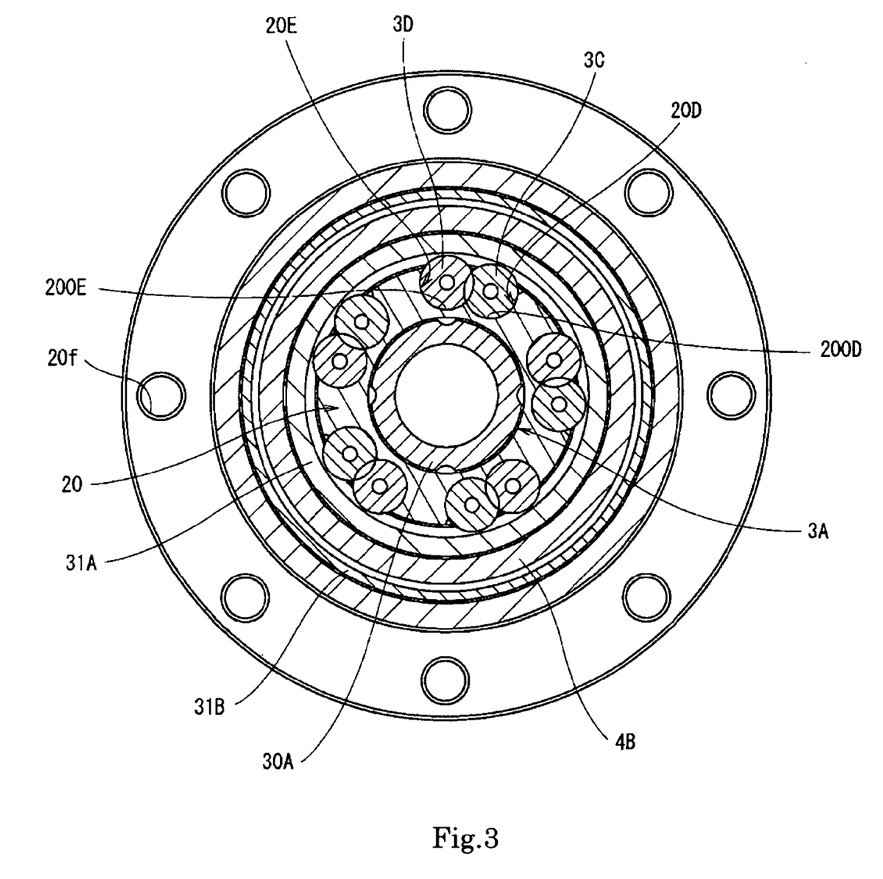
FIG. 3 is a cross sectional diagram viewed from A-A arrow in the FIG. 2.

The tire shaft inserting hole 20C provides an approximately uniform inner diameter and constructs a step penetrating hole into which the left tire shaft 1000 is inserted. The first gear accommodating spaces 20D and the second gear accommodating spaces 20E are respectively communicated with each other as shown in FIG. 3 and are placed in parallel in a same predetermined distance around the rotational axis O of the tire shaft inserted hole 20C shown in FIG. 2.

On a left end portion of the front housing 20 along the rotational axis O is mounted an annular ring gear mounting flange 20F projecting from an outer surface of the front housing 20. The ring gear mounting flange 20F has a plurality of penetrating holes 20f positioned in parallel with each other at a predetermined distance in circumferential direction.

On an inner surface of the front housing 20 is provided an annular stepped surface 200 facing an inner end face of the rear housing 21. On the inner surface of the front housing 20 is also screwed a ring spacer 22 positioned between the stepped surface 20G and the inner end face of the rear housing 21. The ring spacer 22 is made of a non-magnetic material and opened along the rotational axis O.

In a bottom portion of the front housing 20 are formed plural through holes 20H positioned at places corresponding to the second gear accommodating spaces 20E and positioned in parallel with each other at predetermined interval around the rotational axis O. The number of the plural through holes 20H is five in this embodiment. A plurality of filling caps 23 having oil holes 23A respectively cover the plural through holes 20H. A first supporting portion 20I for a right output gear 3B is mounted on the bottom of the front housing 20. The first supporting portion 20I for the right output gear 3B slidably supports a gear portion of a right output gear 3B of the pair of right and left output gears 3B, 3A.

On the other hand, the rear housing 21 consists of a cylindrical first element 21A, an annular second element 21B and a connecting ring 21C, and is screwed into the front housing 20 at the side having the parts inserting inlet as shown in FIG. 2. The second element 21B includes an inner circumferential surface facing an outer circumferential surface of the first element 21A through an annular space 25. The connecting ring 21C is placed between the first element 21A and the second element 21B. The first element 21A and the second element 21B are respectively made of a magnetic material such as soft iron, etc. and the connecting ring 21C is made of a non-magnetic material such as stainless steel, etc.

In the first element 21A of the rear housing 21 is provided a tire shaft inserting hole 210A communicated to the accommodating space 20B of the front housing 20 and opened in a direction of the rotating axis O of the tire shaft inserted hole 20C. The tire shaft inserting hole 210A has an approximately uniform inner diameter and is constructed as a stepped penetrating hole penetrated by a right tire shaft 1000A. A second supporting portion 210B for the right output gear 3B supports slidably a boss portion of the right output gear 3B of the pair of right and left output gears 3B, 3A on the stepped surface of the tire shaft inserting hole 210A.

[Construction of the Differential Mechanism 3]

The differential mechanism 3 includes the pair of right and left output gears 3B, 3A, a plurality of first pinion gears 3C and a plurality of second pinion gears 3D, and is accommodated in the accommodating space 20B of the housing 2 as shown in FIGS. 1 and 2. A gear member 31A of the left output gear 3A and a gear member 32B of the right output gear 3B are respectively constructed with a helical gear and also the plural first pinion gears 3C and the plural second pinion gears 3D are respectively constructed with a helical gear. The first pinion gears 3C are engaged in mesh with the gear member 31A of the left output gear 3A in condition that gear axes of the pinion gears 3C are parallel with a gear axis of the left output gear 3A. On the other hand, the second pinion gears 3D are engaged in mesh with the first pinion gears 3C respectively as shown in FIG. 3 and also the gear member 32B of the right output gear 3B in condition that gear axes of the pinion gears 3D are parallel with a gear axis of the right output gear 3B.

The output gear 3A includes a boss member 30A as a first boss portion and the gear member 31A as a first cylindrical portion, and is arranged rotatably on the rotational axis O of the housing 2 as shown in FIG. 2. As shown in FIG. 3, a gear diameter ratio between an engaging portion of the gear member 31A of the output gear 3A with the first pinion gears 3C and an engaging portion of the gear member 32B of the output gear 3B with the second pinion gears 3D is equal to a gear diameter ratio between the first pinion gears 3C and the second pinion gears 3D so that a velocity ratio of the output gears 3A, 3B can be set as an equal ratio, i.e., 1 to 1. Each of the gear diameters is a pitch circle diameter.

The boss member 30A consists of a hollow cylindrical member having an annular flange 300A at an approximately center portion of the boss member 30A along its axial direction. The flange 300A is mounted slidably against a flange 300B of the output gear 3B and an inner surface of the front housing 20 through a washer 27 and a washer 28 respectively. An inner gear portion on an internal surface of the boss member 30A engages in mesh with a left output shaft of the pair of right and left output shafts 1000 and 1000A by spline engagement after the left output shaft is inserted into the tire shaft inserted hole 20C.

The gear member 31A consists of an internal gear, like a ring gear, having an internal peripheral surface faced to an outer peripheral surface of the boss member 30A through a first annular space 29 and the gear member 31A is a cylindrical body having a partial bottom. The internal gear of the gear member 31A engages in mesh with the outer surface portion of the flange 300A of the boss member 30A in spline engagement. The end of the gear member 31A is slidably mounted on a gear member 32B of the output gear 3B through a washer 34 and the bottom of the gear member 31A is slidably mounted on the flange 300B through the washer 27.

The output gear 3B includes a boss member 30B as a second boss portion, an intermediate member 31B as a hollow second cylindrical portion and the gear member 32B, as shown in FIG. 2. The output gear 3B is slidably mounted at an axis of the output gear 3A such that part of the boss member 30A is inserted into the output gear 3B.

The boss member 30B consists of a cylindrical member having the flange 300B facing the flange 300A of the output gear 3A. The boss member 30B is slidably disposed at a second supporting portion 210B for the right output gear through a washer 26. An inner gear portion on an internal surface of the boss member 30B engages in mesh with a right output shaft of the pair of right and left output shafts 1000 and 1000A by spline engagement after the right output shaft is inserted into the tire shaft inserting hole 210A.

The intermediate member 31B consists of a cylindrical member having an inner peripheral surface facing an outer peripheral surface of the gear member 31A of the output gear 3A through a second annular space 30. The intermediate member 31B is constructed to function as a single body with the flange 300B of the boss member 30B. In the intermediate member 31B are formed a plurality of pin through holes 310B penetrated movably and respectively by plural push pins 35 as an output transmitting member along a direction parallel to the rotating axis O. The plural pin through holes 310B are formed at predetermined intervals to each other in the peripheral direction of the intermediate member 31B.

Figure 4:
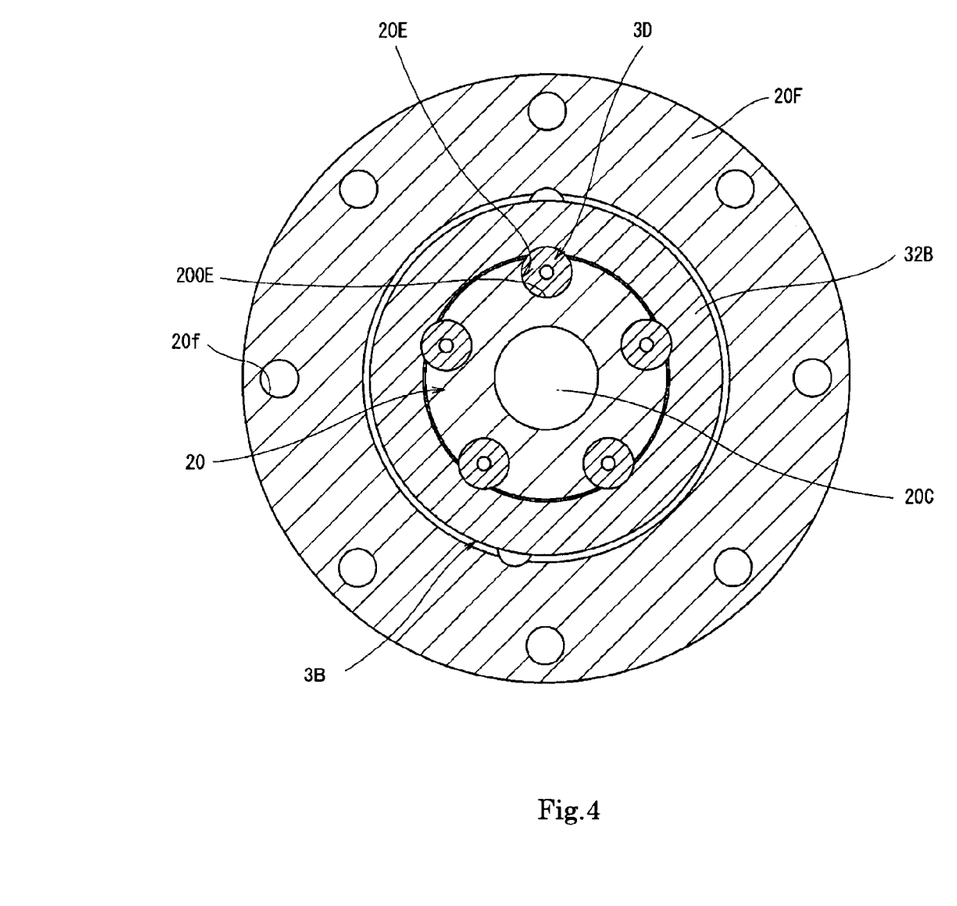
FIG. 4 is a cross sectional diagram viewed from B-B arrow in the FIG. 2.

The gear member 32B consists of an annular internal gear, like a ring gear, positioned at a side of the left tire shaft in the second annular space 30, as shown in FIG. 2 and FIG. 4. The gear member 32B is slidably mounted on a first supporting member 20I for the right output gear through a washer 24 and engaged in mesh with a gear portion of an internal surface of the intermediate member 31B by spline engagement. Therefore, the output gear 3B is engaged in mesh with the second pinion gear 3D through the boss member 30B and the gear member 32B engaged with the boss member 30B by the spline engagement.

Figure 5:
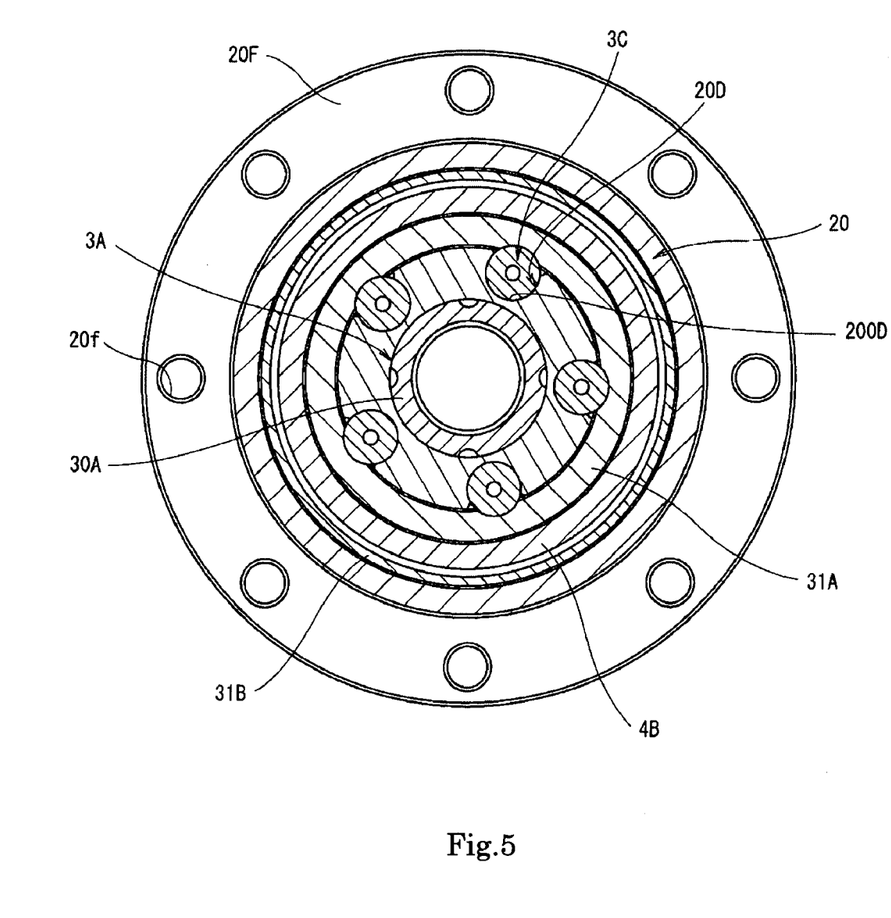
FIG. 5 is a cross sectional diagram viewed from C-C arrow of the FIG. 2.

The plurality of first pinion gears 3C are rotatably accommodated in plural first gear accommodating spaces 20D respectively, as shown in FIG. 3 and FIG. 5. Each peripheral surface of the first pinion gears 3C is slidably mounted on one of a plurality of first torque transmitting surfaces 200D. Each left side of the first pinion gears 3C is slidably supported by one of the first pinion gear supporting surfaces 201D, respectively.

The plurality of second pinion gears 3D are rotatably accommodated in plural second gear accommodating spaces 20E respectively as shown in FIG. 3 and FIG. 4. Each peripheral surface of the first pinion gears 3C is slidably mounted on one of a plurality of second torque transmitting surfaces 200E. Each right side of the second pinion gears 3D is slidably supported by one of second pinion gear supporting surfaces 201E, respectively.

[Construction of the Clutch 4]

As shown in FIG. 2, the clutch 4 is a friction type main clutch consisting of a plurality of inner clutch plates 4A as a first clutch plate and a plurality of outer clutch plates 4B as a second clutch plate. The clutch 4 is installed directly between the output gear 3A and the output gear 3B, extending circumferentially out of the output gear 3A and circumferentially inside the output gear 3B in the second annular space 30. The clutch 4 directly connects and disconnects the output shaft 4A and the output shaft 4B in order to construct to restrict a differential movement of the differential mechanism 3. By the above construction, the differential restricting force is doubled compared to the conventional apparatus.

Each of the plural inner clutch plates 4A and each of the outer clutch plate 4B are disposed alternatively in a portion facing each other along the rotational axis O and consist of an annular frictional plate. The inner clutch plates 4A are engaged in mesh with an outer peripheral portion of the gear member 31A of the output gear 3A in a way of a spline engagement and the outer clutch plates 4B are engaged in mesh with an inner peripheral portion of the intermediate member 31B of the output gear 3B in a way of a spline engagement. One outer clutch plate 4b at a far right end of the plural clutch plates 4B functions as an input portion into the clutch 4 so that it is constructed to connect the output gear 3A and the output gear 3B in order to transmit a rotational force of the housing 2 by frictionally engaging the outer clutch plates 4A and the inner clutch plates 4B by a movement of the one clutch plate 4b to a pushing direction when the one clutch plate 4b receives a pushing force toward the left tire shaft from a cam member, detailed later, of the output mechanism 5 through the plurality of the pushing pins 35. The plural pushing pins 35 are urged to original position by a spring, etc.

[Construction of the Output Mechanism 5]

The output mechanism 5 includes an electromagnetic clutch 5A, a pilot clutch 5B driven by the electromagnetic clutch 5A, and a cam mechanism 5C connectable to the housing 2 by the pilot clutch 5B. The output mechanism 5 is placed at a right side of the clutch 4.

The electromagnetic clutch 5A has an electromagnet 50A and an armature 51A, and is disposed at an outer peripheral area of the boss member 30B of the output gear 4B. The electromagnet 50A is disposed in the annular space 25 of the rear housing 21 and supported rotatably by an outer peripheral surface of the first element 21A through a ball bearing 32. The armature 51A is disposed at a side of the left tire shaft of the pilot clutch 5B and engaged in mesh with an inner surface of the ring spacer 22 in a spline engagement. The armature 51A is constructed to move in a direction to approach an internal end face of the rear housing 21 by the electromagnetic force of the electromagnet 50A.

The pilot clutch 5B is a frictional sub-clutch having a plurality of inner clutch plates 50B and a plurality of outer clutch plates 51B and is disposed between the armature 51A and the rear housing 21. The pilot clutch 5B is constructed such that it connects and disconnects the housing 2 and a cam mechanism 5C of a cam member 50C described later in detail, and transmits the rotational force of the housing 2 to the cam member 50C.

Each of the plural inner clutch plates 50B and each of the plural outer clutch plates 51B are alternatively disposed at a position faced to each other along the rotational axis O and are made as annular frictional plates. The plural inner clutch plates 50B are engaged with an outer peripheral surface of the cam 50C by spline engagement and the plural outer clutch plates 51B are engaged with an inner peripheral surface of a ring spacer 22 by a spline engagement.

The cam mechanism 5C includes a second cam member 50C rotated by receiving the rotational force from the housing 2, a cam follower 51C creating the pushing force by rotation of the cam member 50C, a first cam member 52C outputting by receiving the pushing force of the cam follower 51C, and the plurality of the pushing pins 35 transmitting the pushing force from the cam member 52C to the clutch 4. The cam mechanism 5C is accommodated between an inner peripheral surface of the ring spacer 22 and an outer peripheral surface of the boss member 30B of the output gear 3B.

The cam member 50C has an unillustrated annular cam groove opened to a side of cam follower and is disposed at a peripheral area of the boss member 30B of the output gear 3B. The cam member 50C is rotatably supported by an inner end face of the first element 21A, that is to say an inner opening peripheral edge of the tire shaft inserted hole 210A, through a needle bearing 33.

The cam follower 51C is inserted between a groove bottom of the cam groove of the cam member 50C and a cam side end face of the cam member 52C and is constructed as a spherical ball. The cam follower 51C transmits the pushing force generated by rotation of the cam member 50C to the cam member 52C.

The cam member 52C consists of an annular member having a pushing face 520C facing the pushing force receiving faces 35A of the plural pushing pins 35 and the outer clutch plate 4b. The cam member 52C is accommodated between a flange 300B of the output gear 3B and the armature 51A of the electromagnet clutch 5A and is engaged in mesh with an outer peripheral portion of the boss member 30B of the output gear 3B in spline engagement. The cam member 52C is constructed such that it generates output by receiving the pushing force from the cam follower 51C to exert it on the pushing force receiving faces 35A of the plural pushing pins 35 from the pushing surface 520C.

The pushing pins 35 are disposed between the outer clutch plate 4b of the input portion of the clutch 4 and the output portion of the cam member 52C and are movably inserted in pin inserted holes 310B of the flange 300B of the output gear 3B along the rotational axis O. The pushing pins 35 are constructed to receive the pushing force from the cam member 52C to transmit it to the outer clutch plate 4b of the clutch 4.

[Operation of the Differential Limiting Device 1]

When the torque from the engine of the vehicle is input into housing 2 through a driving pinion and a ring gear, the housing 2 is rotated around the rotational axis O. Upon the rotation of the housing 2, the rotational force is transmitted to the first pinion gears 3C and the second pinion gears 3D and further transmitted to the output gear 3A and the output gear 3B through the first pinion gears 3C and the second pinion gears 3D. Since each of right and left tire shafts is engaged in mesh with each of the output shafts 3B and 3A in spline engagement, the torque from the engine is transmitted to each of the right and left tire shafts through the driving pinion, the ring gear, the housing 2, the first pinion gears 3C, the second pinion gears 3D and the output gears 3A, 3B.

Where the vehicle is driven in a straight line and there is no slip between the road and each tire on the right and left tire shafts, the first pinion gears 3C and the second pinion gears 3D are revolved without self-rotation around the center axis of the output gears 3A, 3B upon the transmission of the torque from the engine to the housing. The first and the second pinion gears 3C, 3D and the output gears 3A, 3B are rotated as a body with the housing 2 so that torque from the engine is transmitted equally to right and left tire shafts to rotate each tire at same rotational speed.

Where the right wheel drops into a muddy ground to cause a slip, the first pinion gears 3C and the second pinion gears 3D are each rotated around its own axis as self-rotation with intermeshing with the output gears 3A, 3B, so that torque from the engine is distributed differently to the right and left tires. In actuality, the left tire is rotated at lower speed than the speed of the housing 2 and the right tire is rotated at higher speed than the speed of the housing 2.

In this embodiment of the present invention, the differential rotation of the output gears 3A, 3B is restricted based on the operation described in next at 1 and 2 when the torque is input from the engine into the housing 2.

1 When the first pinion gears 3C and the second pinion gears 3D are rotated, each gear edge surface of the first pinion gears 3C and the second pinion gears 3D slides on the first torque transmitting surface 200D and the second torque transmitting surface 200E of the internal surface defining the first gear accommodating space 20D and the second gear accommodating space 20E so that it generates frictional resistance between them to restrict the differential rotation of the output gears 3A, 3B by the frictional resistance.

On the other hand, upon the rotation of the first pinion gears 3C and the second pinion gears 3D, thrust force along the rotational axis is generated to each of the first pinion gears 3C, the second pinion gears 3D and the output gears 3A, 3B at the intermeshing surface between the pinion gears 3C, 3D and the output gears 3A, 3B because of a helical intermeshing engagement. The thrust force generated at the output gears 3A, 3B tends to separate the gear member 31A of the output gear 3A and the gear member 32B of the output gear 3B from each other to push the output gear 3A and the output gear 3B to the washer 27 and the washer 24, so that frictional resistance arises between the output gear 3A and the washer 27 and between the output gear 3B and the washer 24 to restrict the differential rotation of the output gears 3A, 3B by this frictional resistance.

Furthermore, each side face of the first pinion gears 3C is pushed on each of the first pinion gear supporting surfaces 201D and each of the second pinion gears 3D is pushed on each of the second pinion gear supporting surfaces 201E based on the thrust force generated on the first pinion gears 3C and the second pinion gears 3D, so that frictional resistance is created against the each self-rotation of the first pinion gears 3C and the second pinion gears 3D. Therefore, the differential rotation of the output gears 3A, 3B is also restricted by this frictional resistance.

2 When the electro magnetic clutch 5A is excited, a magnetic circuit is constructed through the rear housing 21 and the armature 51A, to move the armature 51A to a side of the pilot clutch or the rear housing by the magnetic force. The pilot clutch 5B is pushed to a side of the rear housing by the movement of the armature 51A so that the inner clutch plates 50B and the outer clutch plates 51B of the pilot clutch 5B approach each other to be contacted in frictional engagement.

Next, after the inner clutch plates 50B and the outer clutch plates 51B are contacted with each other in frictional engagement, the housing 2 and the cam member 50C of the cam mechanism 5C are connected to each other through the pilot clutch 4. At the time of the connection between the housing 2 and the cam member 50C, when the rotational force from the housing 2 is received by the cam member 50C, the rotational force is transformed to the pushing force by the cam member 50C and the cam follower 51C. The pushing force is output from the cam member 52C to the outer clutch plate 4b of the input portion of the clutch 4 through the pushing pins 35.

Then, the outer clutch plate 4b of the clutch 4 is pushed to a side of the bottom of the front housing 20 so that the inner clutch plates 4A and the outer clutch plates 4B of the clutch 4 respectively approach each other to be contacted with frictional engagement, therefore connecting between the gear member 31A and the intermediate member 31B, that is to say between the output gear 3A and the output gear 3B, to be able to transmit the rotational force of the housing 2. Therefore, the differential rotation of the differential mechanism 3 is restricted.

In the embodiment described above, the clutch 4 directly connects the pair of output gears 3A, 3B to transmit the rotational force of the housing 2, to double a differential restricting force of the differential mechanism 3 created by the clutch 4 compared to the conventional differential limiting apparatus having the clutch installed between the input shaft and one of output gears. That is, since the output gears 3A, 3B are rotated reversely to each other at the generation of the differential movement, the differential rotation of the output gears 3A, 3B is doubly restricted by two ways of restriction based on two operations: one is that torque of the output gear 3B transmitted to the output gear 3A through the clutch 4 restricts the rotation of the output gear 3A and the other is that torque of the output gear 3A transmitted to the output gear 3B through the clutch 4 restricts a rotation of the output gear 3B because the clutch is installed directly between the pair of output gears. Thereby, the differential restricting force of the differential mechanism 3 is doubled.

While the differential limiting apparatus according to the present invention has been described in detail with reference to the preferred embodiment, it will be apparent to those skilled in the art that the invention is not limited to the present embodiment, and that the invention may be realized in various other embodiments within the scope of the claims, for example;

1 In the embodiment of the present invention, the gear diameter ratio between the engaging portion of the gear member 31A of the output gear 3A with the first pinion gears 3C and the engaging portion of the gear member 32B of the output gear 3B with the second pinion gears 3D is set to be equal to a gear diameter ratio between the first pinion gears 3C and the second pinion gears 3D so that a velocity ratio of the output gears 3A, 3B can be set as an equal ratio, i.e., 1 to 1, however, the invention is not restricted to the construction but it may be set at other different ratio.

2 In the embodiment of the present invention, the number of the pinion gears 3C and 3D engaged with the output gears 3A and 3B is five. However, the invention is not restricted to this construction, and more or less than five pinion gears 3C and 3D may be set in the housing 2.

What is claimed is:
1. A differential limiting apparatus comprising:
a housing rotatable by a driving force of a driving source;
a differential mechanism having a pair of output gears to distribute said driving force to a pair of output shafts differentially;
a clutch disposed directly between said pair of output gears, said clutch has an annular frictional plate to restrict a differential movement of said differential mechanism; and
an output mechanism arranged to drive said clutch, said output mechanism including a cam member movable along an axis of said cam member, and a transmitting member for transmitting said axial movement of said cam member to said clutch,
wherein:
said clutch is disposed directly and circumferentially on said pair of output gears,
said cam member has a diameter corresponding to a diameter of said frictional plate,
said clutch is constructed with a main clutch connecting and disconnecting said pair of output gears,
one of said pair of output gears of said differential mechanism includes a first boss portion connecting one of said pair of output shafts, and a first cylindrical portion having an inner peripheral surface facing an outer peripheral surface of said first boss portion through a first annular space,
the other one of said pair of output gears of said differential mechanism includes a second boss portion connecting the other one of said pair of output shafts, and a second cylindrical portion having an inner peripheral surface facing an outer peripheral surface of said first cylindrical portion through a second annular space, and
said clutch is installed in said second annular space to have a first clutch plate engaging in mesh with said outer peripheral surface of said first cylindrical portion in spline engagement, and a second clutch plate engaging in mesh with said inner peripheral surface of said second cylindrical portion in spline engagement.

2. A differential limiting apparatus comprising:
a housing rotatable by a driving force of a driving source;
a differential mechanism having a pair of output gears to distribute said driving force to a pair of output shafts differentially;

a clutch disposed directly between said pair of output gears, said clutch has an annular frictional plate to restrict a differential movement of said differential mechanism; and an output mechanism arranged to drive said clutch, said output mechanism including a cam member movable along an axis of said cam member, and a transmitting member for transmitting said axial movement of said cam member to said clutch, wherein said clutch is disposed directly and circumferentially on said pair of output gears; and said cam member has a diameter corresponding to a diameter of said frictional plate, wherein said differential mechanism comprises:

a first pinion gear engaging in mesh with said one of said pair of output gears in a way that a gear axis of said first pinion gear is parallel to a gear axis of said one of said pair of output gears;

a second pinion gear engaging in mesh with said other one of said pair of output gears and said first pinion gear in a way that a gear axis of said second pinion gear is parallel to gear axes of said other one of said pair of output gears and the first pinion gear; and said first pinion gear and said second pinion gear are installed in a first annular space.

3. A differential limiting apparatus according to claim 2, wherein:

said first pinion gear is constructed with a first gear group of a plurality of gears and said second pinion gear is constructed with a second gear group of a plurality of gears;

each of said plurality of gears of said first gear group and said second gear group are arranged at equal distance with each other around a rotational axis of said housing.

4. A differential limiting apparatus according to claim 3, wherein:

each of said plurality of gears of said first gear group and said second gear group is a helical gear.

5. A differential limiting apparatus according to claim 1, wherein said output mechanism includes a cam mechanism having said transmitting member, a first cam as a part of said cam member, a second cam rotated by receiving rotational force from said housing as an other part of said cam member, and a cam follower exerting a pushing force generated by a rotation of said second cam to said first cam follower.

6. A differential limiting apparatus comprising:

a housing rotatable by driving force of a driving source;

a differential mechanism having a pair of output gears to distribute said driving force to a pair of output shafts differentially;

a clutch disposed directly and circumferentially on said pair of output gears, said clutch having an annular frictional plate to restrict a differential movement of said differential mechanism;

an output mechanism for driving said clutch, said output mechanism including a cam member movable along an axis of said cam member, and a transmitting member for transmitting said axial movement of said cam member to said clutch;

one of said pair of output gears of said differential mechanism having a first boss portion connecting one of said pair of output shafts, and a first cylindrical portion having an inner peripheral surface facing an outer peripheral surface of said first boss portion through a first annular space;

the other one of said pair of output gears of said differential mechanism including a second boss portion connecting the other one of said pair of output shafts, and a second cylindrical portion having an inner peripheral surface facing an outer peripheral surface of said first cylindrical portion through a second annular space; wherein said clutch is installed in said second annular space to have a first clutch plate engaging in mesh with said outer peripheral surface of said first cylindrical portion in spline engagement, and a second clutch plate engaging in mesh with said inner peripheral surface of said second cylindrical portion in spline engagement;

said differential mechanism includes a first pinion gear and second pinion gear;

said first pinion gear engaging in mesh with said one of said pair of output gears in a way that a gear axis of said first pinion gear is parallel to a gear axis of said one of said pair of output gears;

said second pinion gear engaging in mesh with said other one of said pair of output gears and said first pinion gear in a way that a gear axis of said second pinion gear is parallel to gear axes of said other one of said pair of output gears and the first pinion gear;

said first pinion gear is constructed with a first gear group of a plurality of helical gears and said second pinion gear is constructed with a second gear group of a plurality of helical gears;

each of said plurality of helical gears of said first gear group and said second gear group are arranged at equal distance with each other around a rotational axis of said housing.

7. A differential limiting apparatus comprising:

a housing rotatable by driving force of a driving source;

a differential mechanism having a pair of output gears to distribute said driving force to a pair of output shafts differentially;

a clutch disposed directly and circumferentially on said pair of output gears, said clutch having an annular frictional plate to restrict a differential movement of said differential mechanism; and an output mechanism for driving said clutch, said output mechanism including a cam member movable along an axis of said cam member, and a transmitting member for transmitting said axial movement of said cam member to said clutch; wherein one of said pair of output gears of said differential mechanism includes a first boss portion connecting one of said pair of output shafts, and a first cylindrical portion having an inner peripheral surface facing an outer peripheral surface of said first boss portion through a first annular space;

the other one of said pair of output gears of said differential mechanism includes a second boss portion connecting the other one of said pair of output shafts, and a second cylindrical portion having an inner peripheral surface facing an outer peripheral surface of said first cylindrical portion through a second annular space;

said clutch is installed in said second annular space to have a first clutch plate engaging in mesh with said outer peripheral surface of said first cylindrical portion in spline engagement, and a second clutch plate engaging in mesh with said inner peripheral surface of said second cylindrical portion in spline engagement;

said differential mechanism includes a first pinion gear and second pinion gear;

said first pinion gear engaging in mesh with said one of said pair of output gears in a way that a gear axis of said first pinion gear is parallel to a gear axis of said one of said pair of output gears;

said second pinion gear engaging in mesh with said other one of said pair of output gears and said first pinion gear in a way that a gear axis of said second pinion gear is parallel to gear axes of said other one of said pair of output gears and the first pinion gear;

said first pinion gear is constructed with a first gear group of a plurality of helical gears and said second pinion gear is constructed with a second gear group of a plurality of helical gears;

each of said plurality of helical gears of said first gear group and said second gear group are arranged at equal distance with each other around a rotational axis of said housing;

said output mechanism has said transmitting member, a first cam as a part of said cam member, a second cam rotated by receiving rotational force from said housing as other part of said cam member, and a cam follower exerting pushing force generated by a rotation of said second cam to said first cam follower.

* * * * *